United States Patent
Butron et al.

(10) Patent No.: US 12,472,966 B2
(45) Date of Patent: Nov. 18, 2025

(54) OPTIMIZING ALERTS FOR VEHICLES EXPERIENCING STUCK CONDITIONS

(71) Applicant: Motional AD LLC, Boston, MA (US)

(72) Inventors: Gregory Scott Butron, Singapore (SG); Andrew Shacklock, Singapore (SG)

(73) Assignee: Motional AD LLC, Boston, MA (US)

(*) Notice: Subject to any disclaimer, the term of this patent is extended or adjusted under 35 U.S.C. 154(b) by 36 days.

(21) Appl. No.: 17/991,453

(22) Filed: Nov. 21, 2022

(65) Prior Publication Data
US 2024/0124009 A1 Apr. 18, 2024

Related U.S. Application Data

(60) Provisional application No. 63/416,458, filed on Oct. 14, 2022.

(51) Int. Cl.
*B60W 50/14* (2020.01)
*H04W 4/02* (2018.01)
*H04W 4/40* (2018.01)

(52) U.S. Cl.
CPC ............ *B60W 50/14* (2013.01); *H04W 4/025* (2013.01); *H04W 4/40* (2018.02);
(Continued)

(58) Field of Classification Search
CPC .......... B60W 50/14; B60W 2050/143; B60W 2050/146; B60W 2556/45; H04W 4/025; H04W 4/40
(Continued)

(56) References Cited

U.S. PATENT DOCUMENTS 10,102,495 B1 * 10/2018 Zhang .................. B60R 22/48
2010/0070138 A1 * 3/2010 Schoening ............ B60Q 9/004
701/42

(Continued)

FOREIGN PATENT DOCUMENTS

EP 3147882 3/2017
EP 3147882 A1 * 3/2017 ........... G08G 1/0112
(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — Omar Casillashernandez
(74) *Attorney, Agent, or Firm* — Fish & Richardson P.C.

(57) ABSTRACT

Provided are methods for optimizing alerts for vehicles experiencing stuck conditions, which can include receiving, using at least one processor, data associated with a distance between a location of a vehicle and a destination; determining, using the at least one processor, a derivative of the distance between the location of the vehicle and the destination with respect to a window of time; determining, using the at least one processor, a threshold based on the data associated with the distance between the location of the vehicle and the destination; comparing the derivative to the threshold; and based on the comparison, generating data representing at least one alert indicative of a stuck condition of the vehicle. Systems and computer program products are also provided.

17 Claims, 7 Drawing Sheets

(52) U.S. Cl.
CPC . *B60W 2050/143* (2013.01); *B60W 2050/146* (2013.01); *B60W 2556/45* (2020.02)

(58) Field of Classification Search
USPC ..................................................... 340/425.5
See application file for complete search history.

(56) References Cited

U.S. PATENT DOCUMENTS

| | | | | |
|---|---|---|---|---|
| 2015/0032544 | A1* | 1/2015 | Kim | G06Q 30/0261 705/14.58 |
| 2015/0180816 | A1* | 6/2015 | Varoglu | H04L 51/224 709/206 |
| 2018/0329418 | A1* | 11/2018 | Baalke | G16Z 99/00 |
| 2019/0035043 | A1* | 1/2019 | Jones | G01P 15/0891 |
| 2019/0145794 | A1* | 5/2019 | Ketchell, III | G01C 21/3667 701/439 |
| 2020/0334631 | A1* | 10/2020 | Conlon | G08B 25/10 |

FOREIGN PATENT DOCUMENTS

| | | | | |
|---|---|---|---|---|
| WO | WO 2019125545 | | 6/2019 | |
| WO | WO-2019125545 A1 * | | 6/2019 | ........... B60R 16/023 |

OTHER PUBLICATIONS

International Search Report and Written Opinion in International Appln. No. PCT/US2023/034742, mailed on Jan. 31, 2024, 12 pages.
International Preliminary Report on Patentability in International Appln. No. PCT/US2023/034742, mailed on Apr. 24, 2025, 7 pages.

* cited by examiner

OPTIMIZING ALERTS FOR VEHICLES EXPERIENCING STUCK CONDITIONS

CROSS REFERENCE TO RELATED APPLICATIONS

The present application claims benefit of U.S. Provisional Patent Application No. 63/416,458, filed Oct. 14, 2022, entitled "OPTIMIZING ALERTS FOR VEHICLES EXPERIENCING STUCK CONDITIONS", which is hereby incorporated by reference in its entirety.

BACKGROUND

Vehicles, such as autonomous vehicles, experience period of being stuck during travel. Such a stuck condition of the vehicle may be due to, for example, weather conditions, road conditions, vehicle malfunctions, etc. Further, vehicle sensors are used to determine a vehicle speed or a distance traveled by the vehicle and/or the progress of the vehicle toward its destination is monitored by an operator.

DETAILED DESCRIPTION

Figure 1:
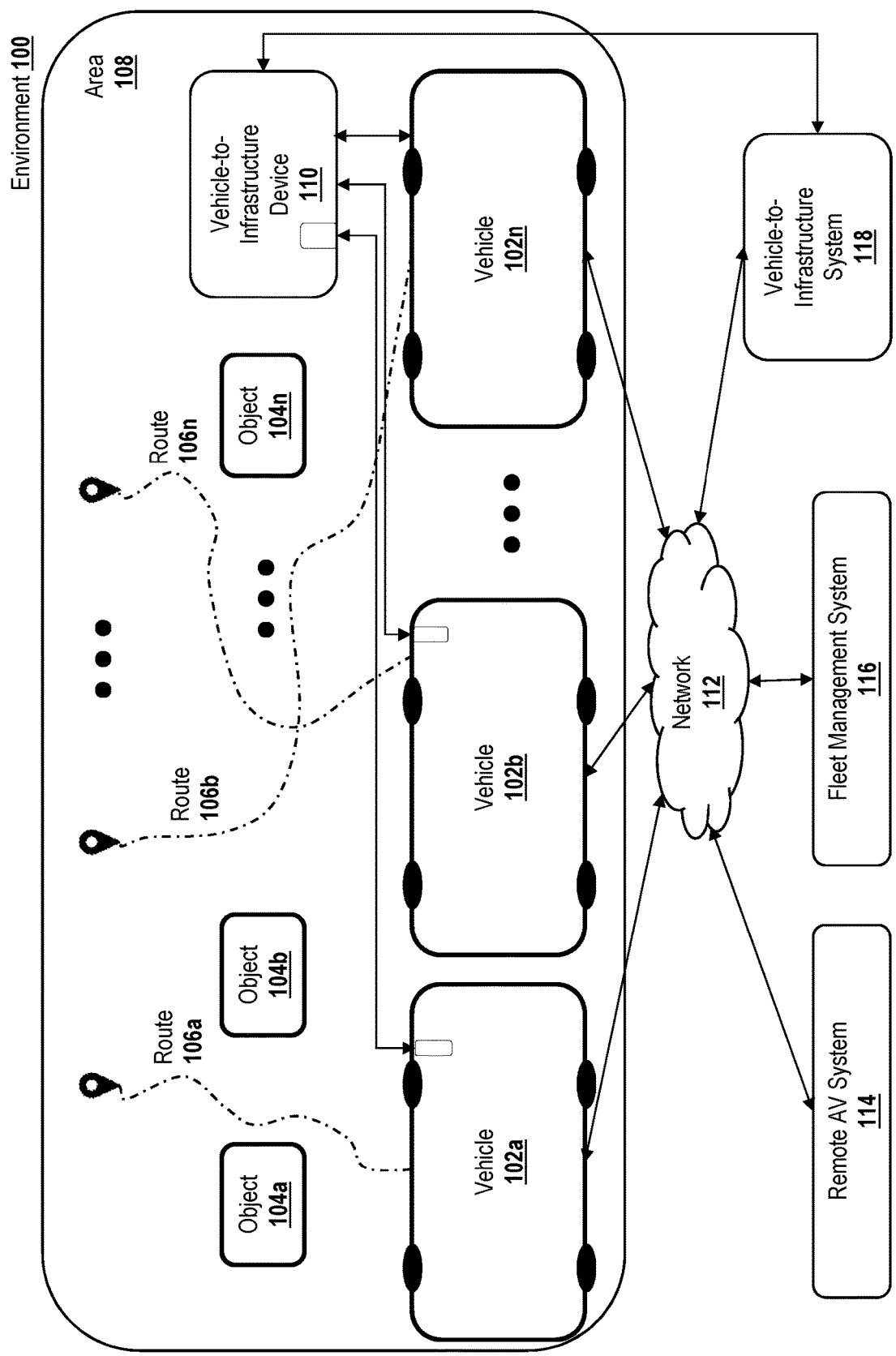
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

GENERAL OVERVIEW

In some aspects and/or embodiments, systems, methods, and computer program products described herein include and/or implement a notification to a remote operator that a vehicle (such as an autonomous vehicle) is stuck (e.g., can no longer proceed on an intended route). In order to determine that the vehicle is stuck, data from the vehicle, is examined with respect to a window of time and is compared to a threshold. For example, the derivative of the vehicle's distance to its destination may be examined over a window of time, e.g., the previous two or five minutes. If the threshold condition is not satisfied, the vehicle is determined to be in a stuck condition and an alert is generated that informs an operator that the vehicle requires attention.

By virtue of the implementation of systems, methods, and computer program products described herein, techniques for optimizing alerts for vehicles experiencing stuck conditions. Some of the advantages of these systems and techniques include the following. A remote operator does not need to pay attention to a vehicle at all times during the vehicle's trip. The stuck condition alert systems and methods alert an operator when attention to the vehicle is necessary. The stuck condition alert systems and methods can differentiate between a true stuck condition, where operator attention is required, and situations in which the vehicle is stopped for other reasons (e.g., traffic lights, stop signs, traffic in an area, etc.).

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
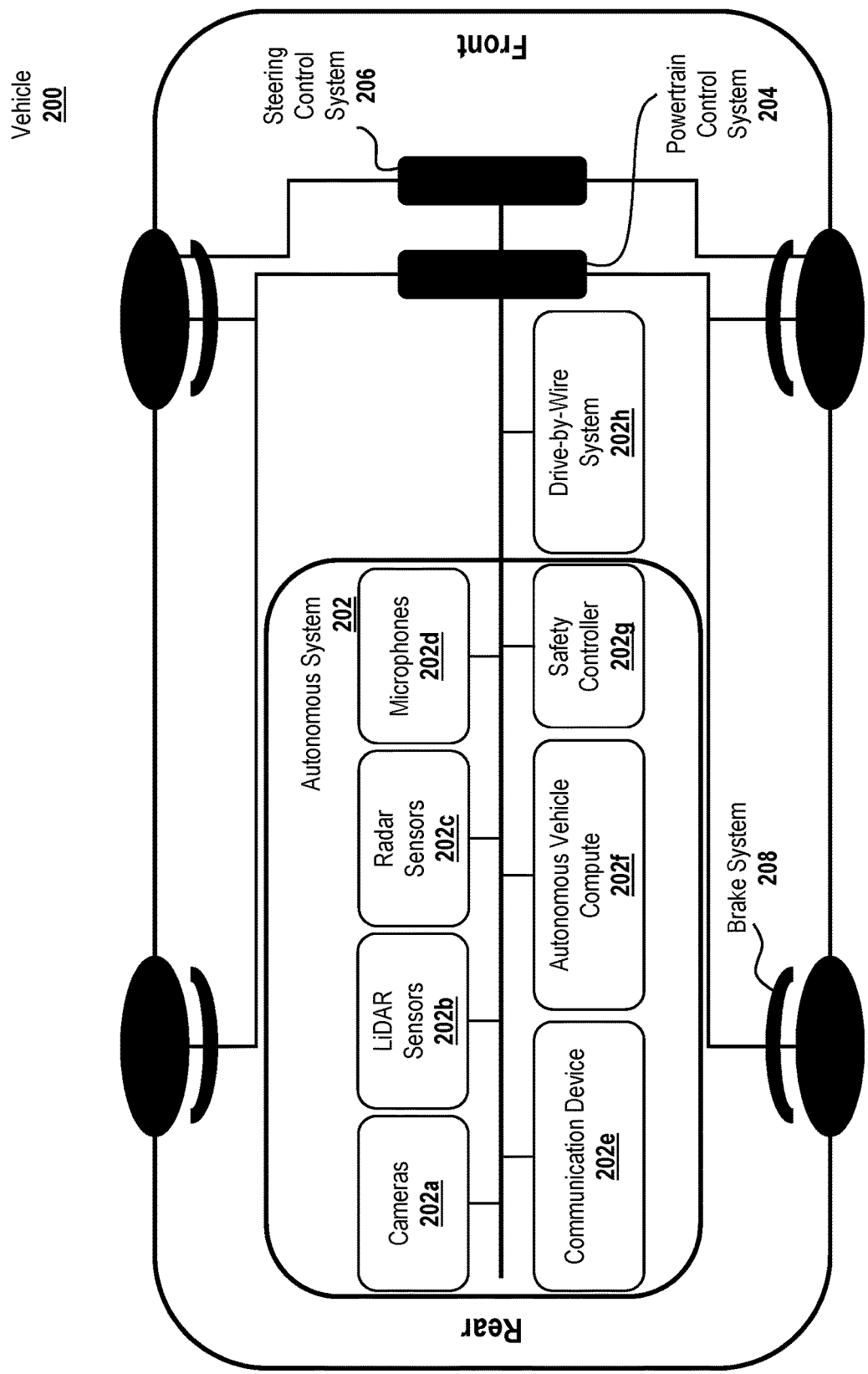
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety.

In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
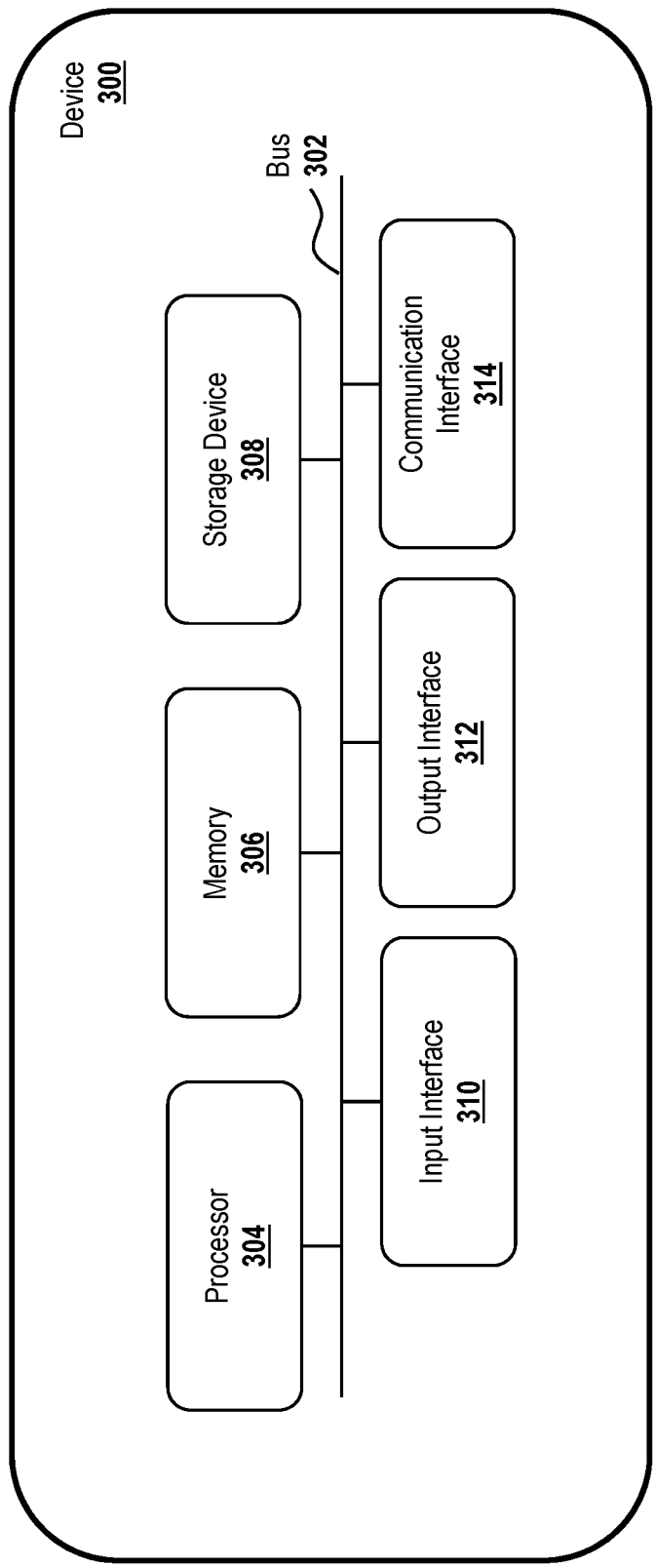
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
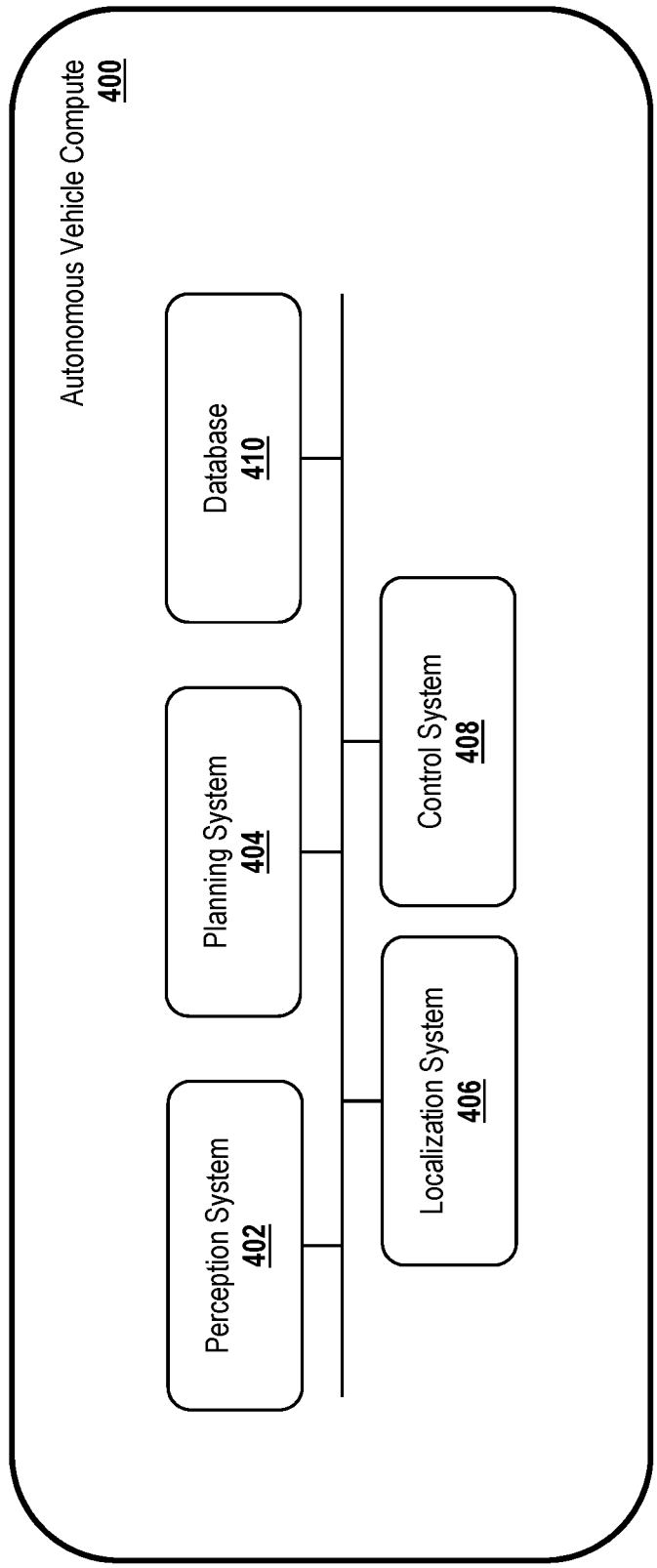
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5A:
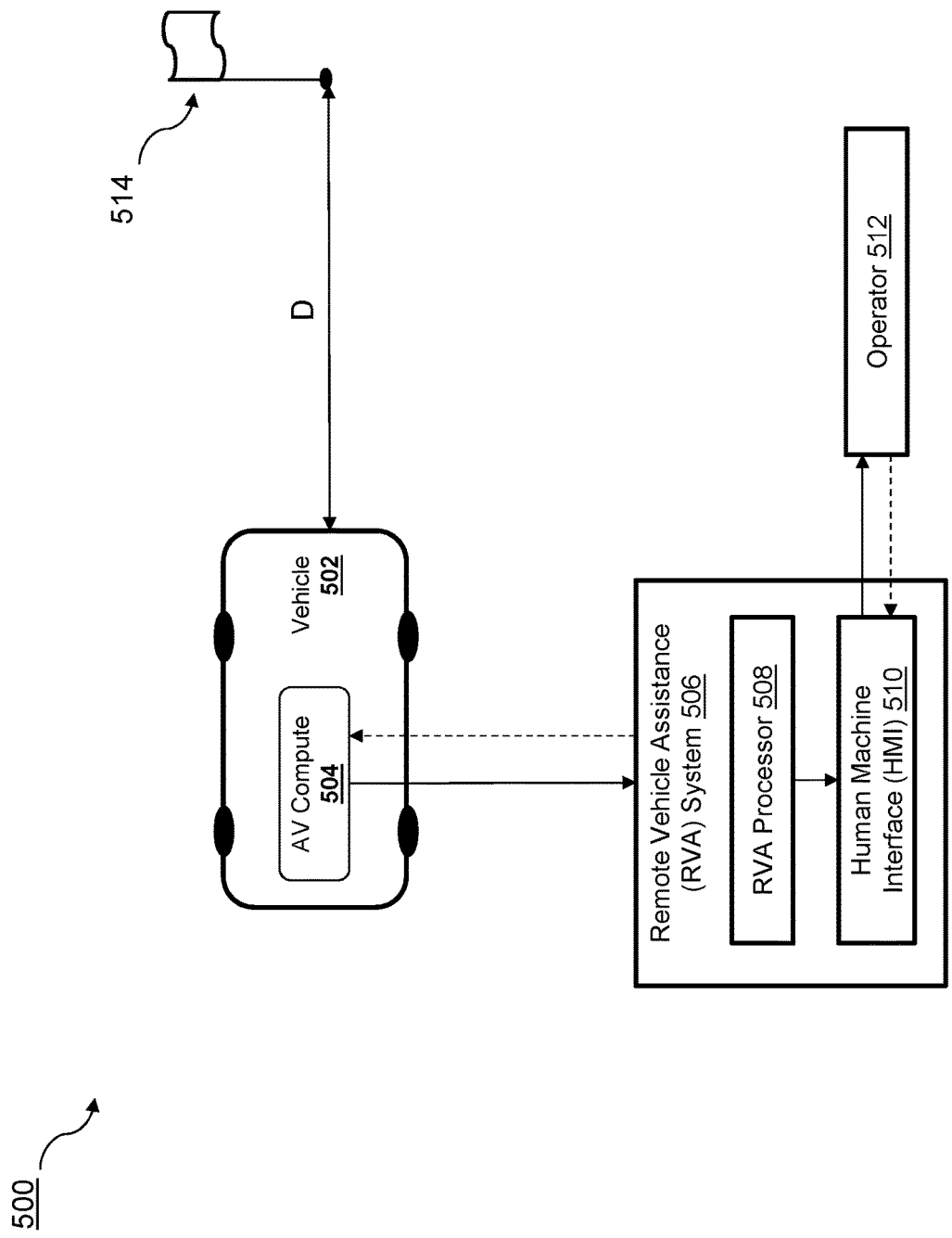
FIG. 5A is a diagram of an implementation of a process for optimizing alerts for vehicles experiencing stuck conditions.
Figure 5B:
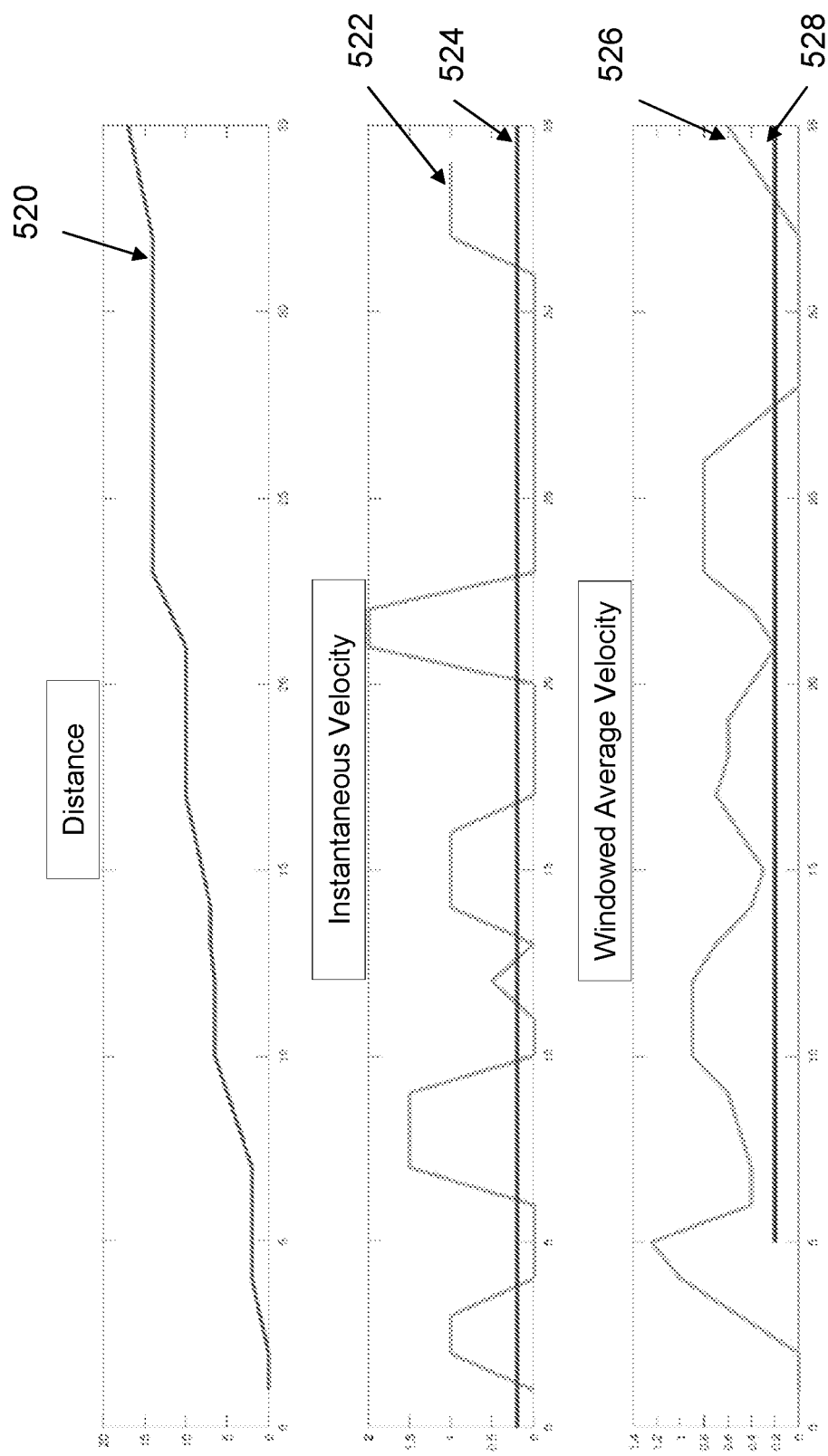
FIG. 5B is a diagram of an example of data representing a distance, an instantaneous velocity, and a windowed average velocity experienced by a vehicle which are used in determining the existence of a stuck condition.

Referring now to FIGS. 5A-5B, illustrated are diagrams of an implementation 500 of a process for optimizing alerts for vehicles experiencing stuck conditions. In some embodiments, implementation 500 includes vehicle 502 and remote vehicle assistance (RVA) system 506.

FIG. 5A shows a diagram of an embodiment of an implementation 500 of a process for optimizing alerts for vehicles experiencing stuck conditions. In implementation 500, a vehicle 502 is located at a distance D from a destination 514. The distance D is determined based on data gathered by one or more instruments or sensors of the vehicle 502, such as the sensors of the sensor suite of autonomous system 202 discussed above with respect to FIG. 2. The distance D changes as the vehicle 502 progresses during a trip. The vehicle includes an AV compute 504 which is configured to manage data representing the distance D. In an example, the AV compute 504 also manages data representing a distance travelled (not shown) during the trip. In an example, the AV compute 504 also manages data associated with a location of the vehicle 502 during the trip. Data representing any of the distances and/or locations above may be used in determining a derivative of the distance between the location of the vehicle and the destination with respect to a window of time.

In an embodiment, the AV compute 504 is configured to determine a derivative of the distance between the location of the vehicle and the destination with respect to a window of time. The window of time is, for example, a previous two minutes, a previous five minutes, a period between a previous two minutes and a previous five minutes, etc.

In an embodiment, the AV compute 504 is configured to compare the derivative to a threshold. In an example, the threshold is a static threshold that is determined prior to or at the start of a trip does not change throughout the trip. In some examples, a threshold is set at a value of a windowed average velocity, e.g., of 0.2 mi/min (12 mph). In an embodiment, a threshold is a dynamic threshold. In some examples, a dynamic threshold is based on particular conditions or parameters of the vehicle or that the vehicle experiences. In some examples, these conditions or parameters include a planned route that the vehicle proceeds along, a road type (e.g., a highway, a city road, a paved road, a gravel road, a dirt road, etc.), a speed limit, a time of day of travel (e.g., morning, afternoon, evening, night, rush hour), a day of travel (e.g., a weekday, a weekend day, a holiday, a particular day of the week, month, or year, etc.), weather conditions (e.g., rain, snow, freezing rain, fog, sun, heat, etc.), a type of vehicle (e.g., passenger vehicle, delivery vehicle, etc.), a number of passengers in the vehicle (e.g., no passengers, having passengers), expected traffic conditions, etc.

In an embodiment, the AV compute 504 is configured to determine if the threshold has been satisfied. In an example, if the threshold is not satisfied, the AV compute 504 determines that the vehicle is experiencing a stuck condition (i.e., the vehicle is not progressing toward its destination as expected) and the AV compute 504 processes instructions to send information to the remote vehicle assistance (RVA) system 506. In an example, the AV compute 504 sends data associated with the stuck condition to the RVA system 506 in addition to an indication that the stuck condition exists.

This data associated with the stuck condition may include the vehicle's location, the time of day (e.g., morning, afternoon, evening, night, rush hour, etc.), the day of travel (e.g., a weekday, a weekend day, a holiday, a particular day of the week, month, or year, etc.), traffic conditions, weather conditions (e.g., rain, snow, freezing rain, fog, sun, heat, etc.), if passengers are in the vehicle (e.g., no passengers, having passengers). In an example, this data associated with the stuck condition may be used to generate a prediction of a subsequent stuck condition. A prediction of a subsequent stuck condition may be for the same vehicle that collected the data associated with the stuck condition or for another vehicle. For example, if the same weather conditions are present on the same road as during a time when a vehicle experienced a stuck condition traveling on that road, a stuck condition may be predicted if a vehicle traverses that road under the same weather conditions. In an example, a probabilistic model may be used to determine the likelihood of a stuck condition occurring.

In an embodiment, the operator initiates the sending of information back to the vehicle. For example, the dotted lines represent use, by the operator 512, of the human machine interface (HMI) to input data to the RVA system 506. The data may include a message that a stuck condition has been reported, that a stuck condition is being resolved, that help is on the way to the vehicle, etc. In this embodiment, the RVA system 506 transmits data representing the input by the operator to the vehicle.

FIG. 5B shows a diagram of an example of data representing a distance, an instantaneous velocity, and a windowed average velocity experienced by a vehicle (e.g., vehicle 502 of FIG. 5A) which are used in determining the existence of a stuck condition. In an example scenario, a curve 520 in a distance graph represents the vehicle increasing in distance traveled (on the y axis) versus time (on the x axis). This increase in distance traveled is not linear versus time, as is expected due to varying speed limits, traffic lights, stop signs, etc. The derivative of this distance corresponds to a curve 522 representing instantaneous velocity. This instantaneous velocity and a selection of a time window is used to generate a curve 526 representing windowed average velocity. This windowed average velocity is compared to a threshold 528, which is shown as a static threshold in the example of FIG. 5B. As curve 526 representing windowed average velocity dips below a curve representing the threshold 528, the threshold is not satisfied and a processor (e.g., AC compute 504 shown in FIG. 5A) determines that the vehicle is experiencing a stuck condition.

Figure 6:
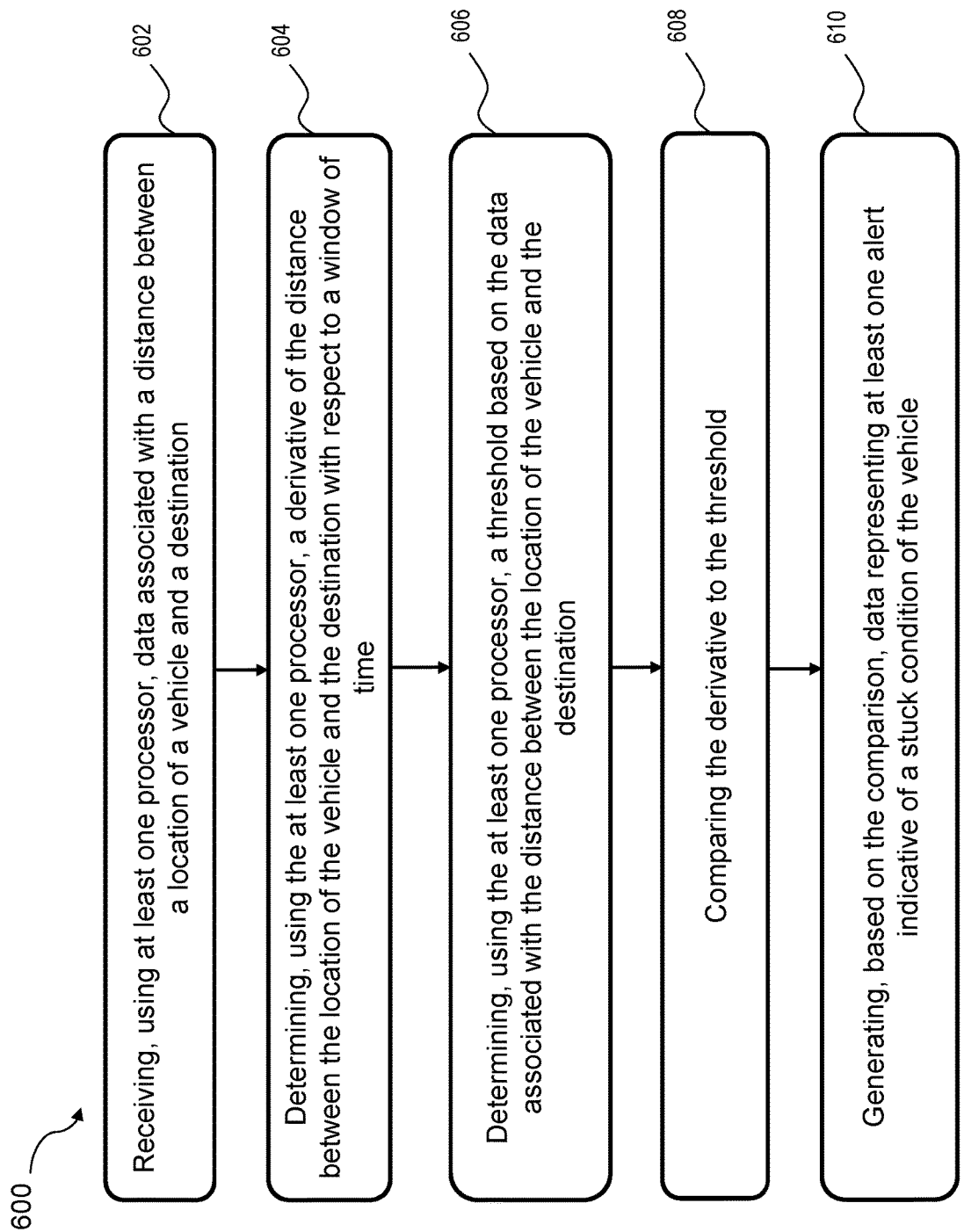
FIG. 6 is a flowchart of a process for optimizing alerts for vehicles experiencing stuck conditions.

Referring now to FIG. 6, illustrated is a flowchart of a process 600 for optimizing alerts for vehicles experiencing stuck conditions. In some embodiments, one or more of the steps described with respect to process 600 are performed (e.g., completely, partially, and/or the like) by autonomous vehicle (AV) compute 504 (which may be the same as, or similar to, AV compute 202f of FIG. 2 and/or AV compute 400 of FIG. 4). Additionally, or alternatively, in some embodiments one or more steps described with respect to process 600 are performed (e.g., completely, partially, and/or the like) by another device or group of devices separate from the autonomous vehicle computer 504, such as remote vehicle assistance (RVA) system 506.

The process includes receiving 602 data associated with a distance between a location of a vehicle (e.g., vehicle 502 of FIG. 5A) and a destination (e.g., destination 514 of FIG. 5A). In an embodiment, the data associated with the distance between the location of the vehicle and the destination includes at least one of a location of the vehicle, a distance travelled along a route, and/or a distance remaining to the vehicle's destination.

The process 600 includes determining 604 a derivative of the distance between the location of the vehicle and the destination with respect to a window of time. In an embodiment, the window of time comprises a period between a previous two minutes and a previous five minutes. In an embodiment, the window of time is continuously updated. In an example, the window of time is updated at a frequency of at least 1 Hz.

The process 600 includes determining 606 a threshold based on the data associated with the distance between the location of the vehicle and the destination. In an embodiment, a threshold is a static threshold. In some examples, a threshold is set at a value of an average velocity for a period of time, e.g., of 0.2 mi/min (12 mph). In an embodiment, the threshold is a dynamic threshold. In some examples, a dynamic threshold is based on particular conditions or parameters of the vehicle or that the vehicle experiences. In some examples, these conditions or parameters include a planned route that the vehicle proceeds along, a road type (e.g., a highway, a city road, a paved road, a gravel road, a dirt road, etc.), a speed limit, a time of day of travel (e.g., morning, afternoon, evening, night, rush hour), a day of travel (e.g., a weekday, a weekend day, a holiday, a particular day of the week, month, or year, etc.), weather conditions (e.g., rain, snow, freezing rain, fog, sun, heat, etc.), a type of vehicle (e.g., passenger vehicle, delivery vehicle, etc.), a number of passengers in the vehicle (e.g., no passengers, having passengers), expected traffic conditions, etc. In an example, the dynamic threshold is increased in instances of bad weather. In another example, the dynamic threshold is increased for travel occurring during rush hour due to vehicles experiencing longer periods of non-movement during higher traffic. By accounting for the increased likelihood that periods of non-movement during rush hour are due to being stuck in traffic, rather than due to the vehicle experiencing a stuck condition, the higher dynamic threshold reduces the likelihood of false positives in identifying a stuck condition. In another example, the dynamic threshold is decreased when travelling on an expressway.

The process 600 includes comparing 608 the derivative of the distance between the location of the vehicle and the destination with respect to a window of time to the threshold. In an embodiment, if the threshold is not satisfied, the process 600 further includes determining that the vehicle is experiencing the stuck condition, meaning that the vehicle is not progressing towards its destination and requires attention from an operator. In an embodiment, the process 600 also includes storing, on at least one memory, data associated with the stuck condition. In an example, this data includes the vehicle's location, the time of day (e.g., morning, afternoon, evening, night, rush hour, etc.), the day of travel (e.g., a weekday, a weekend day, a holiday, a particular day of the week, month, or year, etc.), traffic conditions, weather conditions (e.g., rain, snow, freezing rain, fog, sun, heat, etc.), if passengers are in the vehicle (e.g., no passengers, having passengers). In an example, this data associated with the stuck condition is be used to generate a prediction of a subsequent stuck condition. In an example, a prediction of a subsequent stuck condition is for the same vehicle that collected the data associated with the stuck condition or for another vehicle. For example, if the same weather conditions are present on the same road as during a time when a vehicle experienced a stuck condition traveling on that road, a stuck condition is predicted if a vehicle traverses that road under the same weather conditions. In an example, a probabilistic model is used to determine the likelihood of a stuck condition occurring. In an example, probabilistic reasoning uses a network of inferences with multiple sources may lead to one or more output conclusions. In other examples, machine learning and/or neural network techniques are implemented to determine the likelihood of a stuck condition occurring.

The process 600 includes generating 610, based on the comparison of step 608, data representing at least one alert indicative of a stuck condition of the vehicle. In an embodiment, the data representing at least one alert is generated in a processor of a remote vehicle assistance (RVA) system (e.g., RVA system 506 of FIG. 5A). In an embodiment, the data representing the alert is usable to generate at least one of an audible sound and a graphical representation to be presented on a display associated with the RVA system of FIG. 5A. In an example, the audible sound and/or the graphical representation is emitted and/or presented on a human machine interface (HMI) (e.g., HMI 510 of FIG. 5A) of the RVA system to be heard and/or seen by an operator. In an example, the alert is broadcast back to the vehicle experiencing the stuck condition. In an example, the operator hearing and/or seeing the alert makes contact with the vehicle.

In an embodiment, the process also includes receiving, from an operator, an input and sending data representing that input to the vehicle. In an example, the input is at least one of a message that a stuck condition has been reported, that help is on the way to the vehicle, etc.

Clause 1: A system, comprising: at least one processor; and at least one memory storing instructions thereon that, when executed by the at least one processor, cause the at least one processor to carry out operations comprising: receiving data associated with a distance between a location of a vehicle and a destination; determining a derivative of the distance between the location of the vehicle and the destination with respect to a window of time; comparing the derivative to a threshold; and based on the comparison, generating data representing at least one alert indicative of a stuck condition of the vehicle.

Clause 2: The system of clause 1, wherein the window of time comprises a period between a previous two minutes and a previous five minutes.

Clause 3: The system of clauses 1 or 2, the operations further comprising generating notification data associated with at least one of an audible sound or a graphical representation; and transmitting the notification data to cause a user interface to output the audible sound or the graphical representation.

Clause 4: The system of any of clauses 1-3, the operations further comprising determining, if the threshold is not satisfied, that the vehicle is experiencing the stuck condition.

Clause 5: The system according any of clauses 1-4, the operations further comprising storing, on the at least one memory, data associated with the stuck condition.

Clause 6: The system according to clause 5, the operations further comprising generating, based on a portion of the data stored in the at least one memory, a prediction of a subsequent stuck condition.

Clause 7: The system according to any of clauses 1-6, wherein the threshold comprises a dynamic threshold.

Clause 8: A method, comprising: receiving, using at least one processor, data associated with a distance between a location of a vehicle and a destination; determining, using the at least one processor, a derivative of the distance between the location of the vehicle and the destination with respect to a window of time; determining, using the at least one processor, a threshold based on the data associated with the distance between the location of the vehicle and the destination; comparing the derivative to the threshold; and based on the comparison, generating data representing at least one alert indicative of a stuck condition of the vehicle.

Claim 9: The method according to clause 8, wherein the window of time comprises a period between a previous two minutes and a previous five minutes.

Clause 10: The method according to any of clauses 8 or 9, wherein the data representing the alert is usable to generate at least one of an audible sound and a graphical representation to be presented on a display.

Clause 11: The method according to any of clauses 8-10, further comprising determining, if the threshold is not satisfied, that the vehicle is experiencing the stuck condition.

Clause 12: The method according to any of clauses 8-11, further comprising, storing, on the at least one memory, data associated with the stuck condition.

Clause 13: The method according to clause 12, further comprising, generating, based on a portion of the data stored in the at least one memory, a prediction of a subsequent stuck condition.

Clause 14: The method according to any of clauses 8-13, wherein the window of time is continuously updated.

Clause 15: A non-transitory computer readable medium comprising instructions stored thereon that, when executed by at least one processor, cause the at least one processor to carry out operations comprising: receiving, using at least one processor, data associated with a distance between a location of a vehicle and a destination; determining, using the at least one processor, a derivative of the distance between the location of the vehicle and the destination with respect to a continuously updating window of time; comparing the derivative with a threshold; and if the threshold is not satisfied, generating data representing at least one alert indicative of a stuck condition of the vehicle.

Clause 16: The non-transitory computer readable medium according to clause 15, wherein the window of time comprises a period between a previous two minutes and a previous five minutes.

Clause 17: The non-transitory computer readable medium according to clause 15 or 16, wherein the data representing the alert is at least one of an audible sound and a graphical representation of an alert to be presented on a display.

Clause 18: The non-transitory computer readable medium according to any of clauses 15-17, the operations further comprising determining, if the threshold is not satisfied, that the vehicle is experiencing a stuck condition.

Clause 19: The non-transitory computer readable medium according to any of clauses 15-18, the operations further comprising, storing, on the at least one memory, data associated with the stuck condition.

Clause 20: The non-transitory computer readable medium according to clause 19, the operations further comprising, generating, based on a portion of the data stored in the at least one memory, a prediction of a subsequent stuck condition.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   at least one processor; and
   at least one memory storing instructions thereon that, when executed by the at least one processor, cause the at least one processor to carry out operations comprising:
   receiving data associated with a distance between a location of a first vehicle and a destination;
   determining a derivative of the distance between the location of the first vehicle and the destination with respect to a window of time, wherein the derivative of the distance over the window of time corresponds to a curve representing a windowed average velocity;
   comparing the derivative to a threshold, wherein when the curve representing the windowed average velocity dips below a curve representing the threshold, the threshold is not satisfied;
   based on the comparison wherein the threshold is not satisfied, generating data representing at least one alert indicative of a stuck condition of the first vehicle, wherein data associated with the stuck condition comprises a vehicle location, a time of day, a day of travel, and weather conditions stored on the at least one memory; and
   generating, based on a portion of the data associated with the stuck condition stored on the at least one memory, a prediction of a subsequent stuck condition of another vehicle that traverses a same road with a same weather condition as during a time when the first vehicle experienced a stuck condition traveling on the same road.

2. The system of claim 1, wherein the window of time comprises a period between a previous two minutes and a previous five minutes.

3. The system of claim 1, the operations further comprising:
  generating notification data associated with at least one of an audible sound or a graphical representation; and
  transmitting the notification data to cause a user interface to output the audible sound or the graphical representation.

4. The system of claim 1, the operations further comprising:
  determining, if the threshold is not satisfied, that the first vehicle is experiencing the stuck condition.

5. The system of claim 1, wherein the threshold comprises a dynamic threshold.

6. A method, comprising:
  receiving data associated with a distance between a location of a first vehicle and a destination;
  determining a derivative of the distance between the location of the first vehicle and the destination with respect to a window of time, wherein the derivative of the distance over the window of time corresponds to a curve representing a windowed average velocity;
  determining a threshold based on the data associated with the distance between the location of the first vehicle and the destination;
  comparing the derivative to the threshold, wherein when the curve representing the windowed average velocity dips below a curve representing the threshold, the threshold is not satisfied;
  based on the comparison wherein the threshold is not satisfied, generating data representing at least one alert indicative of a stuck condition of the first vehicle wherein data associated with the stuck condition comprises a vehicle location, a time of day, a day of travel, and weather conditions; and
  generating, based on a portion of data associated with the stuck condition stored on the at least one memory, a prediction of a subsequent stuck condition of another vehicle that traverses a same road with a same weather condition as during a time when the first vehicle experienced a stuck condition traveling on the same road.

7. The method according to claim 6, wherein the window of time comprises a period between a previous two minutes and a previous five minutes.

8. The method according to claim 6, wherein the data representing the alert is usable to generate at least one of an audible sound and a graphical representation to be presented on a display.

9. The method according to claim 6, further comprising determining, if the threshold is not satisfied, that the first vehicle is experiencing the stuck condition.

10. The method according to claim 6, wherein the window of time is continuously updated.

11. A non-transitory computer readable medium comprising instructions stored thereon that, when executed by at least one processor, cause the at least one processor to carry out operations comprising:
  receiving, using at least one processor, data associated with a distance between a location of a first vehicle and a destination;
  determining, using the at least one processor, a derivative of the distance between the location of the first vehicle and the destination with respect to a continuously updating window of time, wherein the derivative of the distance over the window of time corresponds to a curve representing a windowed average velocity;
  comparing the derivative with a threshold, wherein when the curve representing the windowed average velocity dips below a curve representing the threshold, the threshold is not satisfied;
  if the threshold is not satisfied, generating data representing at least one alert indicative of a stuck condition of the first vehicle, wherein data associated with the stuck condition comprising a vehicle location, a time of day, a day of travel, and weather conditions are stored on at least one memory; and
  generating, based on a portion of data associated with the stuck condition stored on the at least one memory, a prediction of a subsequent stuck condition of another vehicle that traverses a same road with a same weather condition as during a time when the first vehicle experienced a stuck condition traveling on the same road.

12. The non-transitory computer readable medium according to claim 11, wherein the window of time comprises a period between a previous two minutes and a previous five minutes.

13. The non-transitory computer readable medium according to claim 11, wherein the data representing the alert is at least one of an audible sound and a graphical representation of an alert to be presented on a display.

14. The non-transitory computer readable medium according to claim 11, the operations further comprising determining, if the threshold is not satisfied, that the vehicle is experiencing a stuck condition.

15. The system of claim 1, wherein the stuck condition is a true stuck condition indicative of the vehicle not progressing toward the destination and needing attention from an operator.

16. The system of claim 1, wherein the prediction of the subsequent stuck condition is by a probabilistic model.

17. The system of claim 1, wherein the prediction of the subsequent stuck condition is generated by a machine learning model.

* * * * *